June 24, 1930.  S. F. ANDERSON  1,767,640
POWER SCRAPER
Filed April 30, 1927  5 Sheets-Sheet 1

Inventor:
Swan F. Anderson
By Wilson & McCanna
Attys.

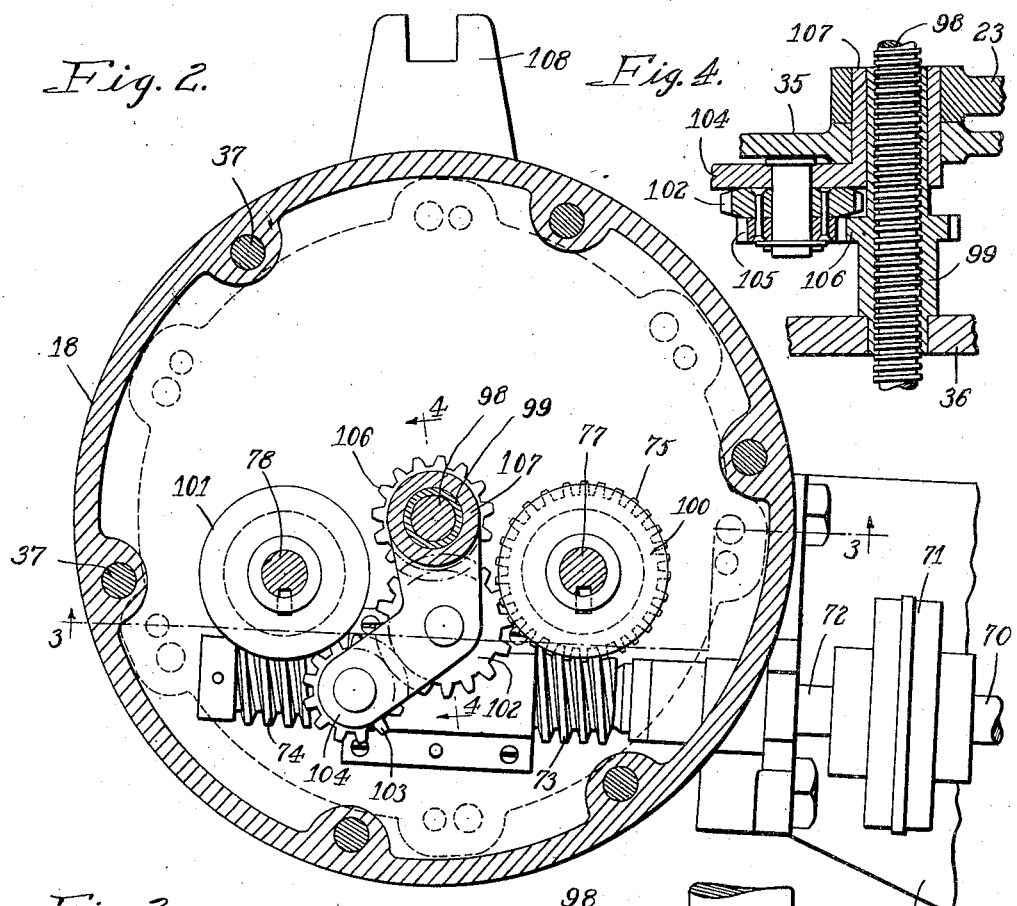
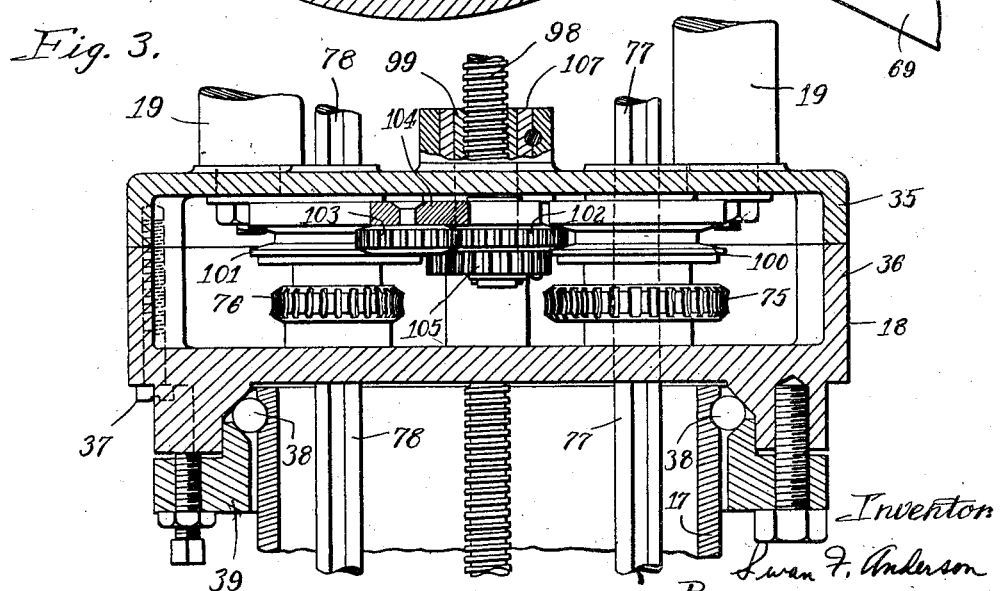

June 24, 1930.  S. F. ANDERSON  1,767,640
POWER SCRAPER
Filed April 30, 1927  5 Sheets-Sheet 3

Inventor:
Swan F. Anderson
By Wilson + McCanna
Attys.

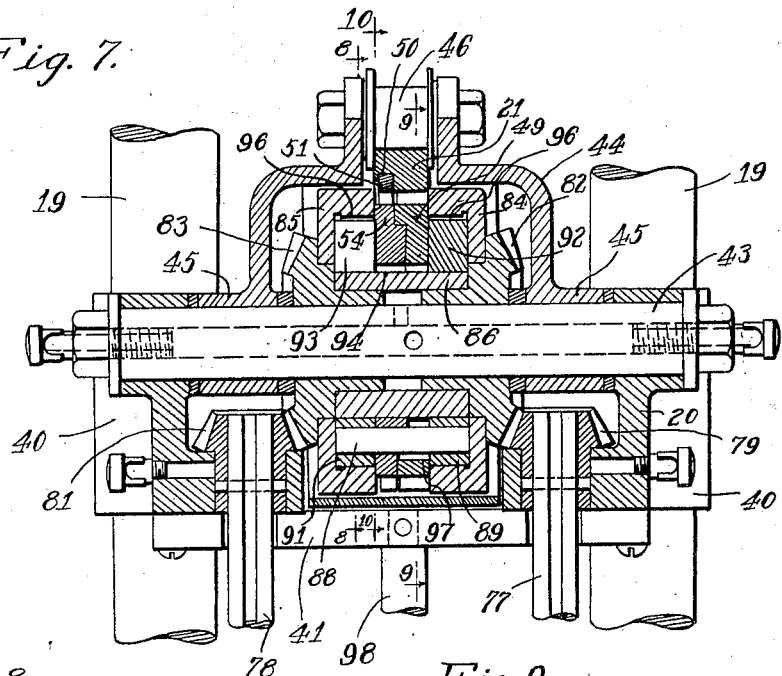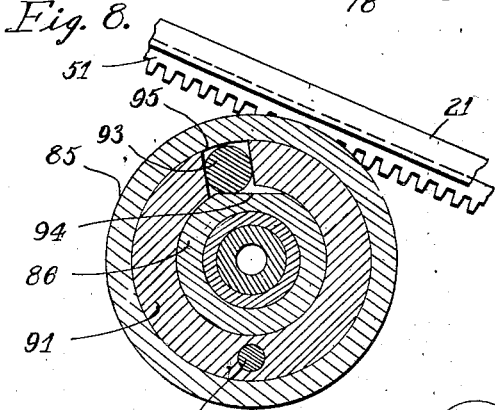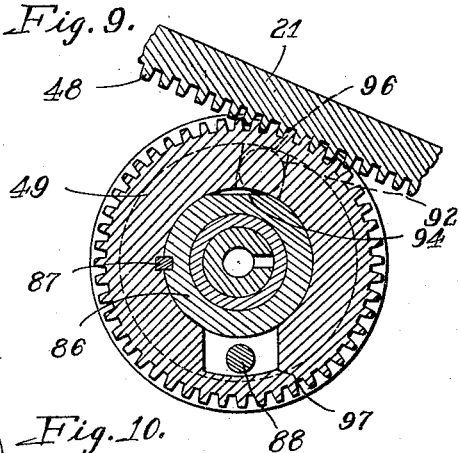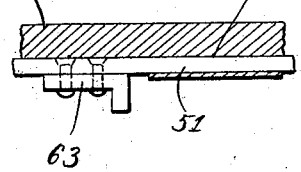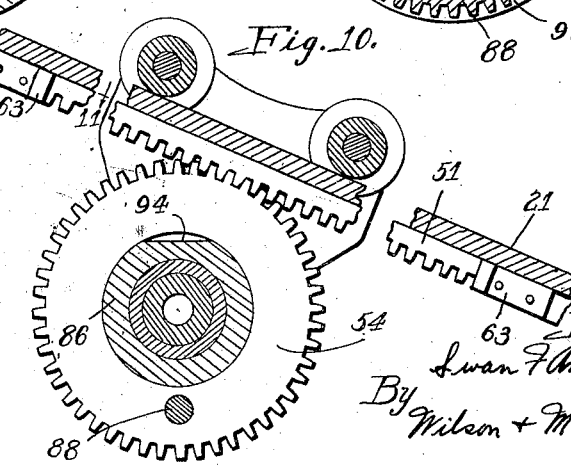

June 24, 1930.  S. F. ANDERSON  1,767,640
POWER SCRAPER
Filed April 30, 1927   5 Sheets-Sheet 5

Inventor:
Swan F. Anderson
By Wilson & McCanna
Attys.

Patented June 24, 1930

1,767,640

UNITED STATES PATENT OFFICE

SWAN F. ANDERSON, OF ROCKFORD, ILLINOIS

POWER SCRAPER

Application filed April 30, 1927. Serial No. 187,759.

This invention relates to machines which have a manually guidable reciprocating tool. This class of machines includes power scrapers for reducing metal surfaces; and the present invention is an improvement on that disclosed in my Patent No. 1,331,451, dated February 17, 1920. My prior invention provided, briefly stated, a manually guidable tool ram, power mechanism for moving the ram back and forth in a working and a return stroke, and a throttle on the ram for controlling the power mechanism while guiding the tool. With this the operator could manipulate the scraping tool with ease and dexterity in working down or finishing a metal surface and he was relieved from the fatigue and labor incidental to strictly hand operation by reason of the fact that the tool ram was power operated. In my prior machine the ram was pneumatically operated, which imposed certain limitations. The present invention is an advance in many respects.

Among the objects of the present invention are to provide a machine in which the tool ram is mechanically operated, as distinguished from operation by a fluid medium, such as air. The machine may be operated by a small individual electric motor, thus making it readily adaptable to the average machine shop. Furthermore, the machine is portable and may be moved about with facility. Another object is to give increased flexibility in the handling and control of the tool ram so as to make it adaptable to a wider range of work and to enable increased production in work of this kind. Still another object is to improve the ram driving mechanism with a view to securing greater power in the working stroke.

Other objects and attendant advantages will be appreciated by those skilled in this art as the invention becomes better understood by reference to the following description when considered in connection with the accompanying drawings in which—

Fig. 2 is an enlarged horizontal section taken on the line 2—2 of Fig. 1, with the turn-table head swung 90° to the right from its position shown in Fig. 1;

Figure 6:
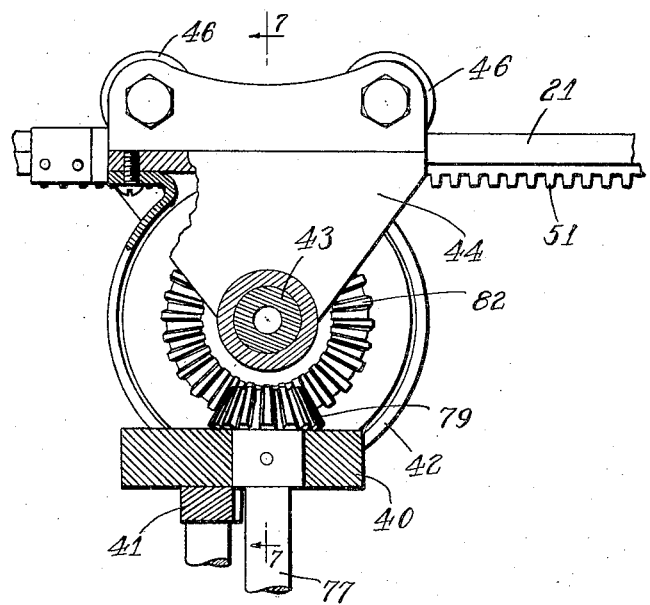
Figure 5:
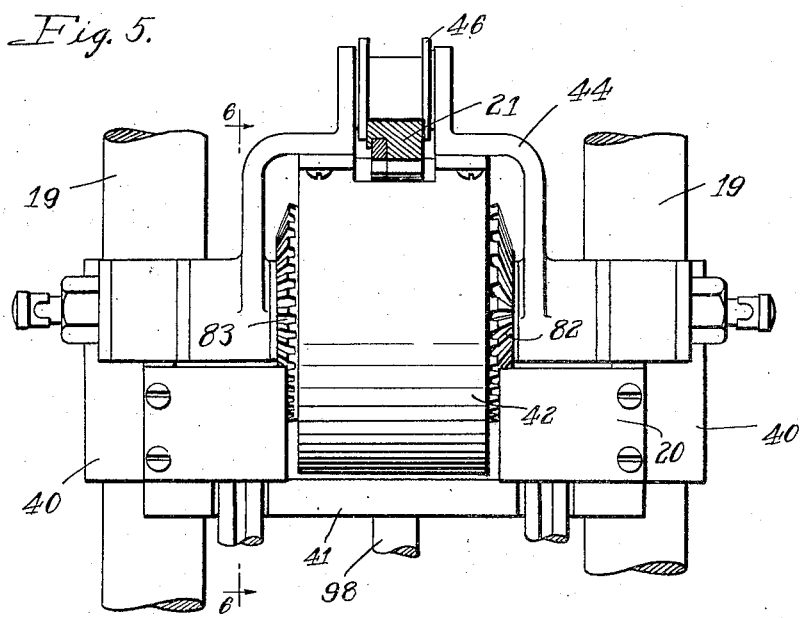
Figure 12:
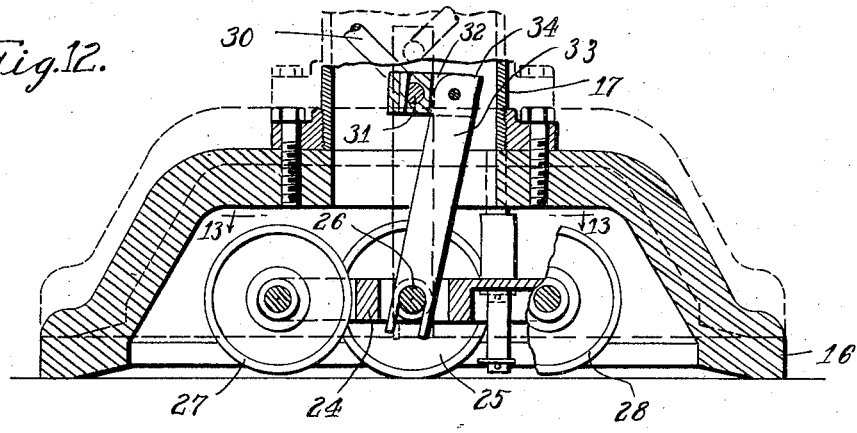
Figure 13:
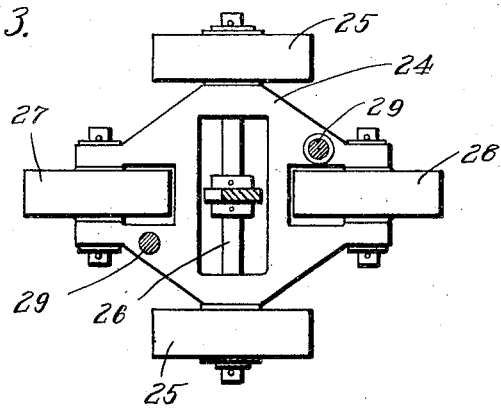
Figure 14:
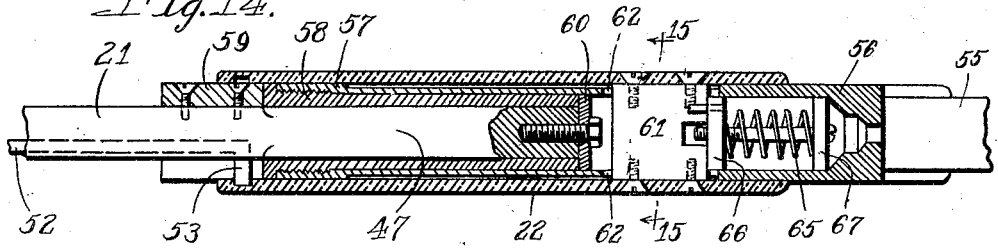
Figure 15:
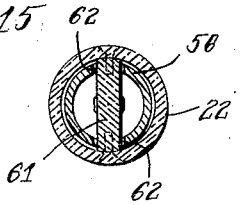

Figs. 3 and 4 are vertical sections on the lines 3—3 and 4—4, respectively, of Fig. 2;

Fig. 5 is an enlarged front view of the ram carriage, with the ram in a horizontal position;

Fig. 6 is a section on the line 6—6 of Fig. 5;

Fig. 7 is a section on the line 7—7 of Fig. 6;

Figs. 8, 9 and 10 are fragmentary sections on the lines 8—8, 9—9 and 10—10, respectively, of Fig. 7;

Fig. 11 is a detail section on the line 11—11 of Fig. 10;

Fig. 12 is an enlarged vertical section through the base;

Fig. 13 is a horizontal section on the line 13—13 of Fig. 12, showing the truck;

Fig. 14 is an enlarged longitudinal section through the tool holder end of the ram; and Fig. 15 is a cross-section on the line 15—15 of Fig. 14.

Briefly, the machine comprises a base 16, an upright column 17 fixed thereon, a turn-table head 18 on the upper end of the column, a pair of laterally spaced upright guide rods 19 fixed to said head, a ram carriage 20 slidable vertically on said rods, a tool ram 21 mounted to reciprocate on the carriage, power mechanism on the head and carriage adapted for reciprocating the tool ram, a control member in the form of a sleeve 22 on the ram for controlling said mechanism, and means controlled by a lever 23 for elevating or lowering the ram carriage. The construction is such that the tool holder end of the ram may be freely moved in any direction for placement with respect to the work to be surfaced. A large range of operation is afforded by reason of the free movement of the turn-table head 18 about a vertical axis, the vertical adjustment of the ram carriage 20, and the portability of the machine as a whole by reason of the truck construction which will be described later. By means of the control member 22 which the operator grasps while guiding and manipulating the tool the drive mechanism is controlled for imparting a forward power stroke and a quick return stroke.

Figure 1:
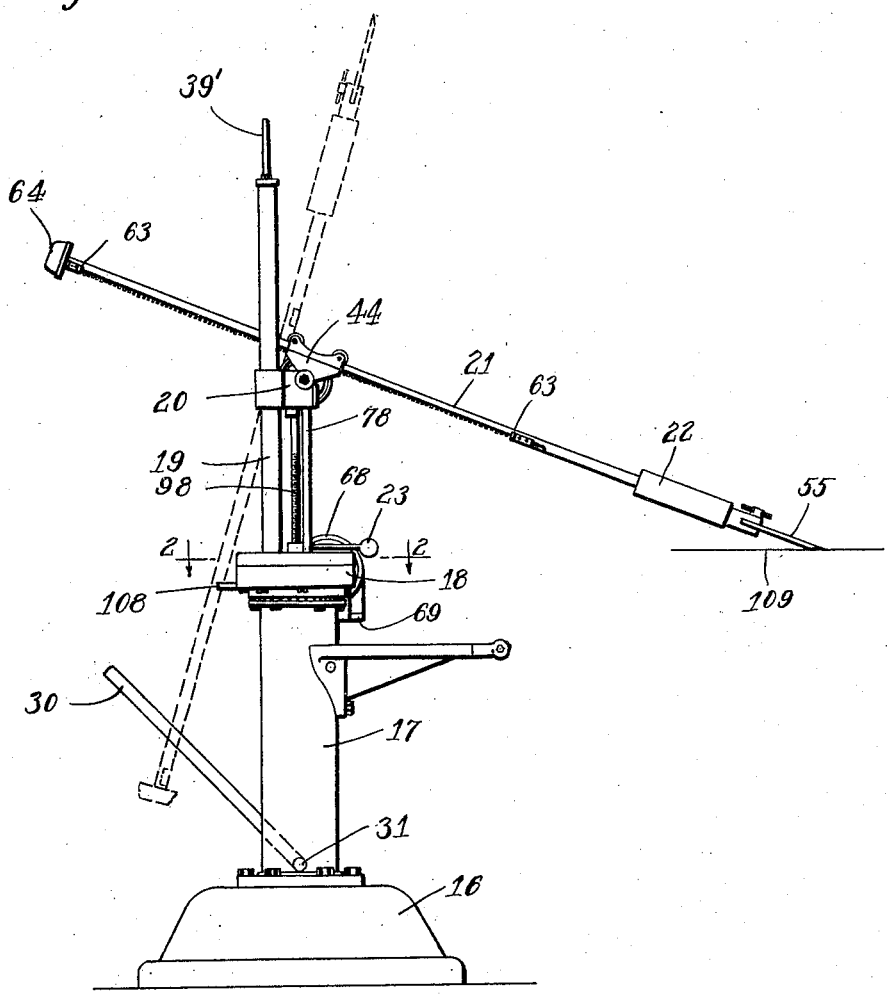
Figure 1 is a side elevation of a power scraper embodying my invention.

The base 16 is heavy and preferably bell-shaped as shown to provide a housing for a wheeled truck used for transportation. The truck comprises a carriage 24 supported by a pair of wheels 25 on a common axle 26 and front and back wheels 27 and 28 on separate axles. The base is connected to the truck carriage by two depending rods 29 which serve as guide rods therefor. In the normal working position of the machine the base 16 rests on the floor, as shown in Figs. 1 and 12. For transportation, the base and all parts carried thereby will be raised clear of the floor so that the machine may be wheeled about on the truck. The base is raised and lowered by operation of a hand lever 30 which has a horizontal end 31 serving as a rock shaft fulcrumed in the column 17, a lever arm 32 fixed to said rock shaft and a link 33 pivoted to the arm 32 and to the axle 26. By swinging the hand lever 30 in a clockwise direction, viewing Fig. 12, the base will be raised to the dotted line position shown in which the pivot between the parts 32 and 33 move beyond a dead center line and further movement is prevented by the stop 34 abutting against an opposite face on the part 32, thus effecting a toggle lock. Reversal of the movement lowers the machine, as will be obvious.

The turn-table head 18 is mounted for rotative movement upon and about the cylindrical column 17. As shown in Figs. 2 and 3, this head is composed of a top and a bottom part 35 and 36 fastened together by screws 37. The bottom part 36 has a ball bearing mounting on the column 17, the balls 38 being disposed in a race-way in the column and the part 36 together with an adjustable ring 39 forming the other race-way. This head provides a housing for parts of the drive mechanism which will be later described. It also provides a base upon which the ram carriage, driving mechanism, and operating parts are carried so that they may all swing as a unit by reason of the rotative movement of the turn-table head. To the upper part 35 of the head are fixed the two upstanding guide rods 19, above mentioned, which are connected together at their upper ends by a strap 39' to which a crane hook may be attached for quickly carrying the machine from one part of the shop to another where overhead cranes are used.

In the present construction the tool ram is supported in part by its drive mechanism and the latter is mounted upon what might be termed a carriage because of the fact that it is slidable vertically upon and between the guide rods 19. Referring to Figs. 5, 6 and 7 carriage brackets 40 mounted to slide on the guide rods 19 are connected at the bottom by a cross-piece 41 and are further connected by a fixed shaft 43 upon which certain of the ram drive mechanism is mounted. A yoke 44 mounted at 45 on said shaft carries a pair of rollers 46 for guiding the ram 21 and maintaining it in operative relation to its drive mechanism and also carries a guard or housing 42 which encircles the drive mechanism mounted on the shaft 43. This yoke is free to swing upon and about said shaft to allow free movement of the ram in a vertical plane.

The tool ram proper is an elongated rod, referred to above as 21, rectangular in cross-section (Fig. 7) throughout its length except for its end 47 (Fig. 14) which is round. The ram has rack teeth 48 on its under side throughout the major length of its rectangular section and these teeth mesh with a drive gear 49 (Figs. 7 and 9) which is adapted to be driven intermittently in opposite directions for imparting the power and return strokes to the ram. The ram also has a groove 50 in its under side co-extensive with the length of its rectangular section in which is located a control slide comprising a rack part 51 and a plain part 52, the latter having an end 53 engaged in a groove in the control sleeve 22, above mentioned. The rack part of the control slide meshes with a gear 54 (Figs. 7 and 10) forming part of the ram drive mechanism which will be presently described, adapted for actuating the clutch device which produces the forward and reverse movements of the ram. The control sleeve 22 is, therefore, shiftable back and forth lengthwise on the ram proper for the purpose of actuating the throttle slide for controlling the ram drive mechanism.

The ram is equipped with a suitable tool holder, that shown being especially designed for holding a scraper blade 55. Referring to Figs. 1 and 14, the blade 55 is clamped in a socket of the holder 56, the end 57 of which is threaded onto a sleeve 58 which in turn is mounted for rotation on the round part 47 of the ram and is held from endwise displacement by collars 59 and 60. The control sleeve 22 has a fixed part 61 extending diametrically through the tool holder, which part by contact with the walls of the slots 62 in the tool holder limits the lengthwise movement of the sleeve thereon and causes said sleeve to move rotatably therewith. In use of the machine the operator stands at the right of the ram facing in the direction of the scraper blade with his right hand grasping the throttle slide and his left hand grasping and bearing down on the top of the scraper blade in the same fashion as holding a hand scraper. By moving the control sleeve forward the ram will be propelled forward in a power stroke and by moving the sleeve backward the ram will be returned by operation of the mechanism which will be presently described. Only a slight lengthwise movement of the control sleeve is required for actuating the clutch mechanism which produces these movements, and inasmuch as the changes will be quickly effected, the control is very sensitive and the operation is practically identical with that when using an ordinary hand scraper.

The control slide 51 is equipped with stop abutments 63 adapted to strike the yoke 44 at the end of either stroke for automatically stopping the drive in the event that it has not been stopped by operation of the control sleeve. The rear end of the ram is equipped with a weight 64 which serves to hold it in the upright position shown in dotted lines in Fig. 1 when not in use, this weight also serving as a buffer to prevent injury in the event that it should strike any object during the return stroke. When in this latter position the uppermost stop 63 rests against the yoke 44 and the weight of the ram is carried on this part. In order to prevent this weight from causing axial displacement of the ram within the control sleeve which would result in accidentally putting the drive into operation, a spring cushion device is provided for sustaining the weight of the ram on the throttle sleeve and thereby maintaining the latter in the neutral position. This comprises a compression spring (Fig. 14) bearing at one end against a part 66 fixed to the diametrical part 61 of the sleeve and bearing at its opposite end against a part 67 fixed to the tool holder. It will be obvious that the weight of the ram will be carried by the spring 65 when in the dotted line position shown in Fig. 1, thus maintaining the parts in the neutral position shown in Fig. 14.

The ram drive mechanism is continuously driven from any suitable source of power, such as an electric motor 68, mounted on a bracket fixed to the turn-table head 18 and terminates in two driving elements revolving in opposite directions which are adapted to be optionally connected as by means of clutches controlled by the control sleeve for propelling the ram in the forward and return strokes.

In the present embodiment of my invention the motor shaft 70 is connected by a coupling 71 to a worm shaft 72 which is suitably journaled in the head 18 and equipped with worms 73 and 74 in mesh with worm gears 75 and 76, respectively. The worm gears 75 and 76 are splined on shafts 77 and 78, respectively, which rotate in bearings in the top and bottom parts of the head 18 and extend upwardly to the ram carriage and have fixed to their upper ends bevel pinions 79 and 81, respectively, the pinion hubs being journaled in the carriage brackets 40. The pinions 79 and 81 mesh with bevel gears 82 and 83, respectively, which are loose on the fixed shaft 43. To the gear 82 is fixed a clutch housing 84 forming the driving member of a clutch and to the gear 83 is fixed a similar member 85. A sleeve 86 journaled to rotate freely upon and between the hubs of the gears 82 and 83 forms a common driven member for both clutch driving members 84 and 85. The gear 49 which meshes with the rack teeth on the tool ram is keyed to the driven clutch member 86 at 87 (Fig. 9) and the gear 54 which meshes with the rack teeth on the control slide 51 is loose on the clutch member 86, both of said gears being disposed side by side. A pin 88 passes through and is fixed to the gear 54 and in turn is fixed at its ends in split rings 89 and 91 which fit within the clutch member 84 and 85, respectively, and are free to be moved in a rotative direction therein by corresponding movement of the gear 54. In the slot-way of the split ring 89 is located a roller 92 and in that of the split ring 91 a roller 93. Said slotways and consequently the rollers are located and held in the fixed relative relation with respect to each other shown in Figs. 8 and 9 by reason of the fact that both split rings are fixedly connected together by the pin 88. The rollers normally rest on a flat surface 94 on the sleeve 86.

The foregoing construction provides two quick-acting friction clutches controlled by the slide 51 and adapted for propelling the tool ram 21 in forward and return strokes. The forward stroke clutch comprises the driving and driven members 84 and 86, the intermediate split ring 89, and roller 92. The return stroke clutch comprises the driving and driven member 85 and 86, the intermediate split ring 91, and the roller 93. The driving members 84 and 85 are continuously driven in opposite directions by the bevel gears, the latter at a faster speed by reason of the smaller diameter of its worm gear 76 in order to give a quick return. The action of both clutches is identical except as to direction of drive. For example, by lengthwise movement of the control slide 51 to the left, viewing Fig. 10, the clutch operating gear 54 will be moved in a counter-clockwise direction, thus moving the split ring 91 in a similar direction (Fig. 8) and forcing the roller 93 in a wedging action between the flat surface 94 and the inner periphery 95 of the driving member 85 with the result that the members 85 and 86 will be connected to rotate together.

This rotation of the sleeve member 86 in a counter-clockwise direction, viewing Fig. 8, rotates the gear 49 in the same direction (Fig. 9) thus moving the ram 21 to the left, that is, in the return stroke. To reverse the direction of the ram for the forward working stroke, the slide 51 will be moved forwardly, thus disengaging the roller 93 from between the surfaces 94 and 95 and moving the split ring 89 in a clockwise direction, viewing Fig. 9, to engage its roller 92 between the surfaces 94 and 96 which results in rotating the sleeve 86 and consequently the gear 49 in the same direction and at the same speed as the driving member 84. But slight movement of the control slide 51 is required for engagement and disengagement of the clutches and the latter by reason of their construction are instantaneous in their action, especially since the driving force aids in engaging and disengaging the clutches. This movement of the slide is, of course, effected by operation of the control sleeve 22 by the operator, as above described. It will be noted that since the clutch control gear 54 is of the same diameter and has the same number of teeth as the ram drive gear 49 both gears will rotate together when the ram is in motion. The clutch control gear, however, has a slight differential movement forward and backward with respect to the drive gear 49 when operated by the control slide, the gear 49 being cut away at 97 (Figs. 7 and 9) to allow this movement. It will now be apparent how the stops 63, above mentioned, fixed to the control slide function by contact against the yoke 44 to stop the drive of the ram in either direction, since the action of these stops against said yoke produces the same effect as shifting the control sleeve 22 to the neutral position.

Means is provided for raising and lowering the ram carriage 20, preferably by power. This comprises an elevating screw 98 fixed to the bottom cross plate 41 on said carriage (Fig. 7) and engaged in a nut 99, (Fig. 4) mounted between the top and bottom parts of the turn-table head 18. To turn the nut quickly and easily power is taken from either of the grooved wheels 100 or 101 concentric and fixed with respect to the worm gears 75 and 76, respectively, within the head 18. To this end, two intermeshing gear wheels 102 and 103 mounted to rotate on a shiftable arm 104 are shaped to fit the V-shaped grooves of the wheels 100 and 101, respectively, and the gear 102 has fixed to its under side a spur gear 105 meshing with a gear 106 fixed to the nut 99. The arm 104 has a collar 107 loose on the upper end of the nut 99 and extending through the head part 35 for attachment to the elevating lever 23. By swinging said lever to the right (assuming the operator is at the front of the machine), viewing Fig. 2, the gear 102 will be frictionally engaged with the wheel 100, thus rotating the nut 99 in a clockwise direction and elevating the ram carriage. By swinging said lever in the opposite direction the gear wheel 103 will be frictionally engaged with the wheel 104, thereby turning the nut 99 in the opposite direction and lowering the ram carriage. Normally the lever 23 stands in a neutral position.

In Fig. 1, the tool ram is shown in a position in which it is commonly used, it being necessary that the operator shall hold the tool ram in this position, otherwise it would drop against the rest 108. The metal surface to be worked is indicated by the line 109. By means of the control member 22 the operator causes the tool ram to be moved forward and backward in working and return strokes of such length as he desires and during these strokes he manipulates the tool holder to secure the proper pressure or contact of the scraping blade against the work. This operation is identical with hand scraping and by reason of the power operation the work may be done quite rapidly and yet with accuracy and precision. The tool holder end of the ram is free for directional movement about the horizontal axis on which the yoke 44 swings and about the vertical axis on which the turn-table head 18 is movable. Elevation of the ram carriage is for the purpose of positioning the tool holder at the proper working angle with respect to the work. The machine thus has a large working range, is easily controlled, and may be conveniently moved about. By reason of the many advantages of this machine it is an important factor in enabling increased production in the manufacture of parts requiring scraping operations.

It should be understood, however, that my invention is adapted for scraping on the return stroke as well as the forward stroke, this being a matter of suiting the machine to the particular kind or class of work. Furthermore, my invention is not confined to scraping metal surfaces but with the application of suitable tools it may be used for working other materials. Furthermore, other tools such as for polishing, abrading, sawing, filing, and the like, may be substituted for the scraping tool.

I claim:

1. A surface working machine comprising a base having an upstanding column, a turntable head on said column, a ram carriage mounted for vertical adjustment on said head, a tool ram mounted for reciprocation on said carriage, a mechanically operating drive mechanism on the ram carriage for reciprocating the ram, and means on the tool ram for controlling said drive mechanism.

2. A tool of the character described comprising, in combination, a ram equipped at one end with a tool holder and adapted to be reciprocated, rack teeth on said ram, a drive gear meshing with said rack teeth, power drive mechanism including two clutches adapted to be optionally engaged, one for rotating said gear for propelling the ram in one direction and the other for propelling it in the opposite direction, a manually operable control member on the tool end of the ram connected with said clutches for engaging them at will to control the direction and length of stroke of the ram, and means supporting the tool ram and said mechanism for taking the working thrust of the tool ram and permitting the tool ram to be manually guided and applied to the work.

3. In combination, a tool holder adapted to be reciprocated, a ram for reciprocating said tool holder, a rack on said ram, a drive gear meshing with said rack, power operated clutches, one adapted to be engaged for propelling the ram in a forward stroke and the other in a return stroke, a control slide moving with the ram and having rack teeth, a gear coaxial with the first-mentioned gear meshing with said teeth on the control slide, and means operated by the second mentioned gear for controlling said clutches.

4. A tool of the character described comprising, in combination, a ram equipped at one end with a tool holder and adapted to be reciprocated, rack teeth on said ram, a mechanical drive mechanism for propelling the ram in forward and return strokes including a forward and a return clutch in coaxial relation and a gear interposed between and coaxial with said clutches and adapted to be driven by either of them, said gear being in mesh with said rack teeth on the ram for reciprocating the latter, a manually operable control member on the tool end of the ram connected with said clutches for engaging them at will to control the direction and length of stroke of the ram, and means supporting the tool ram and said mechanism for taking the working thrust of the tool and permitting the tool ram to be manually guided and applied to the work.

5. In combination, a reciprocable tool ram, mechanical drive means for reciprocating said ram including a gear in mesh with rack teeth thereon, a gear coaxial with the first-mentioned gear and in mesh with a control slide on said ram, a clutch driven member coaxial with and fixed to the first-mentioned gear, two clutch driving members rotating in opposite directions, and means actuated by rotative movement of the second-mentioned gear for connecting either of said driving members to said driven member whereby to propel said ram in either direction.

6. A machine of the character described comprising a base, a turn-table head mounted thereon and equipped with upright guide means, a ram carriage mounted to move on said guide means, a tool ram mounted for reciprocation on said carriage, and mechanism mounted on the turn-table head and said carriage for reciprocating the tool ram.

7. In combination, a base having an upright column, a turn-table head mounted on said column, a pair of fixed upright guide rods mounted on said head, a ram carriage mounted on said guide rods, means for raising and lowering the ram carriage, and drive mechanism mounted on the carriage and connected with the ram for reciprocating it.

8. A tool of the character described comprising, in combination, a ram equipped at one end with a tool holder, rack teeth on said ram, a drive gear meshing with said rack teeth, drive mechanism for rotating said drive gear in either direction to propel the ram back and forth, a manually operable control member on the tool end of the ram connected with said drive mechanism and operable at will to control the direction and length of stroke of the ram, and means supporting said drive gear and ram for taking the working thrust of the ram and permitting the ram to be manually moved universally for application to the work.

9. A machine of the character described comprising a base, an upright column on the base, a turntable on the column, a tool ram mounted to reciprocate on the turn-table and being freely manually guidable at its free end about the axis of the turntable and an axis at right angles thereto and also about the longitudinal axis of the ram for application of the tool to the work, means for moving the ram in a power stroke, and manually operable control means on the ram for controlling said ram-operating means.

10. In a machine of the character described a ram having a rack of substantial length and equipped at one end with a tool holder, a ram-propelling mechanism including a gear in mesh with the rack, a yoke pivotally mounted co-axial with said gear and serving to hold the ram in operative relation to its drive gear and to permit swinging of the ram about the axis of said gear, mechanism for driving said gear, and control means for said mechanism including a gear co-axial with the first mentioned gear and in mesh with a control rack slidable lengthwise on the ram and adapted to be operated for controlling reciprocation of the ram.

11. A tool of the character described comprising a ram equipped at one end with a tool holder, a set of rack teeth fixed to the ram, a control member carried on the ram to slide lengthwise thereon, a set of rack teeth on the control member, a pair of coaxial independently rotatable gears, one meshing with the rack teeth on the ram and the other with the rack teeth on the control member, power driven mechanism for driving the gear connected to the ram and controlled in its driving effect by rotative movement of the control member gear, and means supporting the above defined structure permitting the ram to be manually moved directionally at its tool holder end for applying the tool to the work when the ram is propelled by said power driven mechanism.

12. A tool as set forth in claim 11, in which the power driven mechanism is arranged to propel the ram in a forward and a return stroke by lengthwise movement of the control member on the ram in reverse directions.

13. A tool of the character described comprising a ram equipped at one end with a tool holder, rack teeth on the ram, a gear in mesh with the rack teeth adapted to be rotated for propelling the ram, a supporting structure for the gear and ram permitting the ram to be manually moved at its tool end for applying the tool to the work and permitting manual operation of the tool when it is propelled by said gear simulating manual use of a tool of the same kind, motor driven mechanism on said support arranged to rotate said gear for propelling the tool ram, and control means on the tool end of the ram connected with said mechanism and adapted to be actuated by the operator while manipulating the tool end of the ram to control the operation of the ram by said mechanism.

14. A tool as set forth in claim 13, in which the control means includes a slide member on the ram having rack teeth, a gear on the supporting structure meshing with the rack teeth, and means actuated by the last named gear for controlling the power rotation of the ram-connected gear by said motor driven mechanism.

15. A tool of the character described comprising a ram equipped at one end with a tool holder, a drive gear and a control gear in coaxial relation, the ram having rack teeth in mesh with the drive gear, a control slide on the ram having rack teeth in mesh with the control gear, a support for said gears, the ram being mounted to swing about the axis of the drive gear and also about an axis transverse to said axis of the drive gear to permit universal movement of the tool end of the ram by manual operation of said tool end in the application of the tool to the work, and power driven mechanism controlled by rotative movement of the control gear with respect to the drive gear for rotating said drive gear and thereby propelling the ram.

16. A tool of the character described comprising a ram equipped at one end with a tool holder, rack teeth on the ram, a control member on the ram having rack teeth, and mechanism for propelling and controlling the ram in forward and return strokes and permitting the ram to be moved universally at its tool end by manual operation of said end when applying the tool to the work including a pair of coaxial independently rotatable gears one of which meshes with the rack teeth on the ram and is adapted to be rotated by said mechanism for propelling the ram and the other of which meshes with the rack teeth on the control member and is arranged to control the ram-propelling effect of said mechanism and to be actuated by said control member for so controlling the propelling effect of said mechanism.

17. Mechanism for propelling a tool ram comprising, in combination, a tool ram having rack teeth, a drive gear in mesh with said rack teeth on the ram, a control member on the ram having rack teeth, a control gear coaxial with and rotatable independently of the drive gear and in mesh with said rack teeth on the control member, a forward and a reverse driving member in spaced relation coaxial with said drive and control gears and between which said drive and control gears are interposed, each driving member having an internal annular face constituting the driving member of a clutch, a driven clutch member interposed between and coaxial with said driving clutch faces and fixed to the said drive gear, a split ring loose on each end of said driven clutch member, a roller in the slot-way of each split ring, and faces on the driven clutch member one for each roller along which the roller is adapted to be moved by oscillation of its split ring for clutching connection with the said internal face of its adjacent driving clutch member, said split rings being connected to the control gear and adapted to be actuated by rotative movement of said gear for engaging either clutch to thereby connect either driving member to the drive gear, said control gear being normally free to rotate in unison with the drive gear with the clutches disengaged and adapted to be actuated by sliding the control member on the ram in one direction for engaging one clutch and in the opposite direction for engaging the other clutch, whereby to propel the ram in reverse directions.

18. Mechanism as set forth in claim 17, in which the forward and reverse driving members are mounted to rotate upon a common support, a yoke structure mounted to oscillate upon said support and arranged to hold the ram in operative relation to its drive gear, and a frame structure on which said support is mounted to oscillate about an axis at right angles to that of said driving members.

19. A manually guidable and controllable tool propelled by power in a forward and a return stroke for surface working operations of the character described comprising a ram equipped at one end for carrying a tool, a motor, mechanism operated continuously by the motor adapted for propelling the ram in said forward and return strokes, said mechanism being normally disconnected from the ram in so far as its propelling function is concerned, control means on the tool end of the ram operable while manually guiding the ram for causing said mechanism to propel the ram either in said forward or reverse stroke and for reversing the direction at any time in the stroke, and a supporting structure for the ram which takes the working thrust of the ram.

20. A tool as described in claim 19, in which the ram propelling mechanism includes a clutch for propelling the ram in the forward stroke, a clutch for propelling the ram in the return stroke, and a ram-driving means arranged to be connected to and driven by either of said clutches under control of said control means on the tool end of the ram.

21. A tool as described in claim 19, in which the ram propelling mechanism includes a clutch for propelling the ram in the forward stroke, a clutch for propelling the ram in the return stroke, and a gear in mesh with a rack on the ram arranged to be driven by either of said clutches by operation of the hand control means on the tool end of the ram.

22. A tool of the character described, comprising a ram equipped at one end for carrying a tool, rack teeth on the ram, a drive gear in mesh with the rack teeth for propelling the ram forward and backward, the ram and its drive gear being so mounted as to permit free directional movement of the tool and of the ram under manual guidance of the operator about the axis of the gear and also about an axis transverse to that of the gear, power mechanism for driving said drive gear in either dirction, and manually operable means on the tool end of the ram for controlling the operative effect of the driving connection between said mechanism and drive gear whereby to stop or start or reverse the direction of the tool ram at any time within its maximum length of stroke.

23. A tool of the character described, comprising a ram equipped at one end to carry a tool, a carriage for the ram, a supporting structure upon which the carriage is mounted for vertical adjustment and for free swinging movement about a vertical axis, motor driven mechanism mounted on the carriage for propelling the ram in a forward and a return stroke including clutch mechanism and a gear adapted to be driven in reverse directions by said clutch mechanism, the tool ram having rack teeth engaged by said drive gear whereby to propel the tool ram back and forth, the tool ram being free to swing about the axis of said drive gear as well as about the axis of said carriage to permit manipulation of its tool end in all directions, and manually operable means on the tool end of the ram connected with said clutch mechanism for operating the same at any time for controlling the direction and length of stroke of the tool ram.

24. A tool of the character described comprising a ram equipped at one end for carrying a tool; mechanism for supporting and propelling the ram, said mechanism including a motor and means driven thereby for optional connection to the ram for propelling it in forward and return strokes and for reversing the direction of the ram at any time in either its forward or return stroke, said mechanism being arranged to permit free directional guidance and manipulation of the tool end of the ram during its said operation; means supporting said mechanism and taking the power thrust of the ram so as to relieve the operator from such thrust; and manually operable means on the tool end of the ram for controlling said mechanism to effect any of said operations of the tool ram at will.

25. A power scraper comprising a ram equipped for carrying a tool at one end, a motor, mechanism driven by the motor normally unconnected to the ram but adapted to be connected thereto at will for propelling it in a forward and a return stroke, manually operable means on the tool end of the ram connected with said mechanism for causing it to propel the ram in either direction and for reversing the direction at any time in the stroke at the will of the operator, supporting means on which the ram and said mechanism are mounted for taking the working thrust of the ram, and means permitting free movement of the tool end of the ram by manual operation for application of the tool to the work during the propelling stroke whereby to manually guide and apply the tool to regulate the cut during the power working stroke.

26. A power tool of the character described comprising a base, an upright column thereon, a turn-table head on the column, an upright guide on the turn-table head, a ram carriage mounted on said guide for adjustment vertically thereon, a tool ram adapted to be reciprocated on the carriage, power mechanism on the turn-table head and the carriage for propelling the tool ram in a forward stroke and a return stroke, the ram being freely manually guidable in all directions for application of its tool end to the work, and manually operable control means on the tool end of the ram for controlling the operation of said power propelling mechanism to effect the said forward and return strokes and to vary the length of said strokes to any degree within the maximum length of the stroke.

27. A power tool as set forth in claim 26, in which the power mechanism comprises a motor mounted on the turn-table head and clutch mechanism mounted on the ram carriage driven by the motor and connectible to the tool ram by operation of the manual control means for propelling the tool ram in the manner described.

28. A power tool as set forth in claim 26, in which the upright guide comprises laterally spaced rods upon which the ram carriage is mounted for vertical adjustment, and a crane hook connecting the upper end of the rods and holding them in rigid spaced relation.

29. A power tool as set forth in claim 26, including means driven by the power mechanism for moving the ram carriage vertically on the upright guide.

In witness of the foregoing I affix my signature.

SWAN F. ANDERSON.